Oct. 30, 1951 G. LA V. RUNKLE 2,573,496
RELEASABLE TABLE OPERATING MEANS FOR HEARSES
Filed Oct. 29, 1949 3 Sheets-Sheet 2
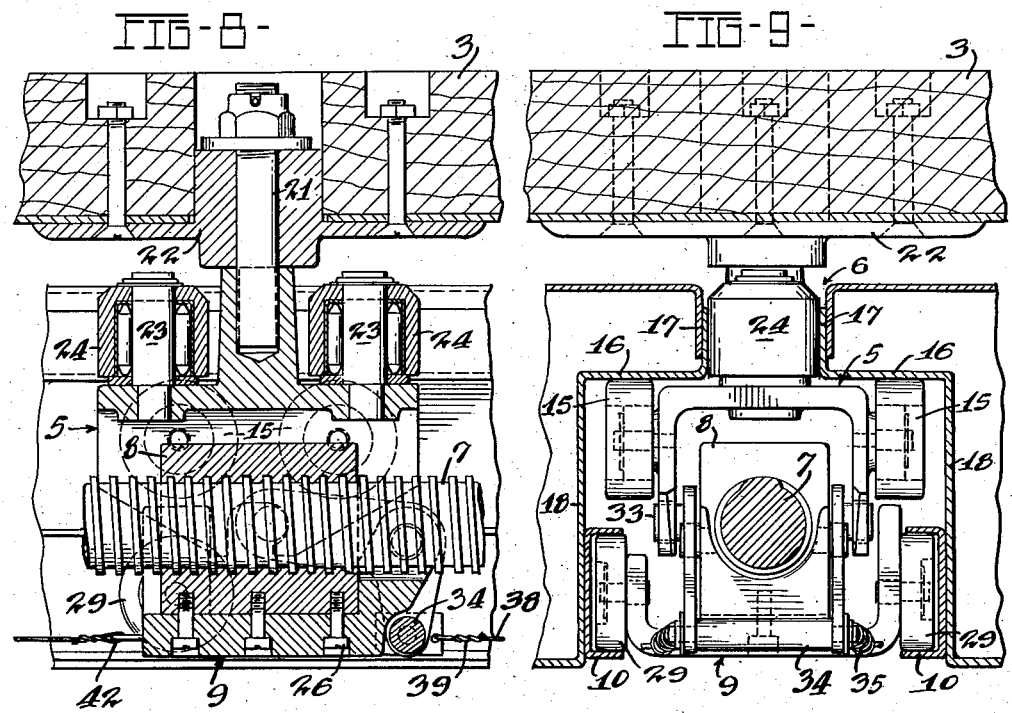
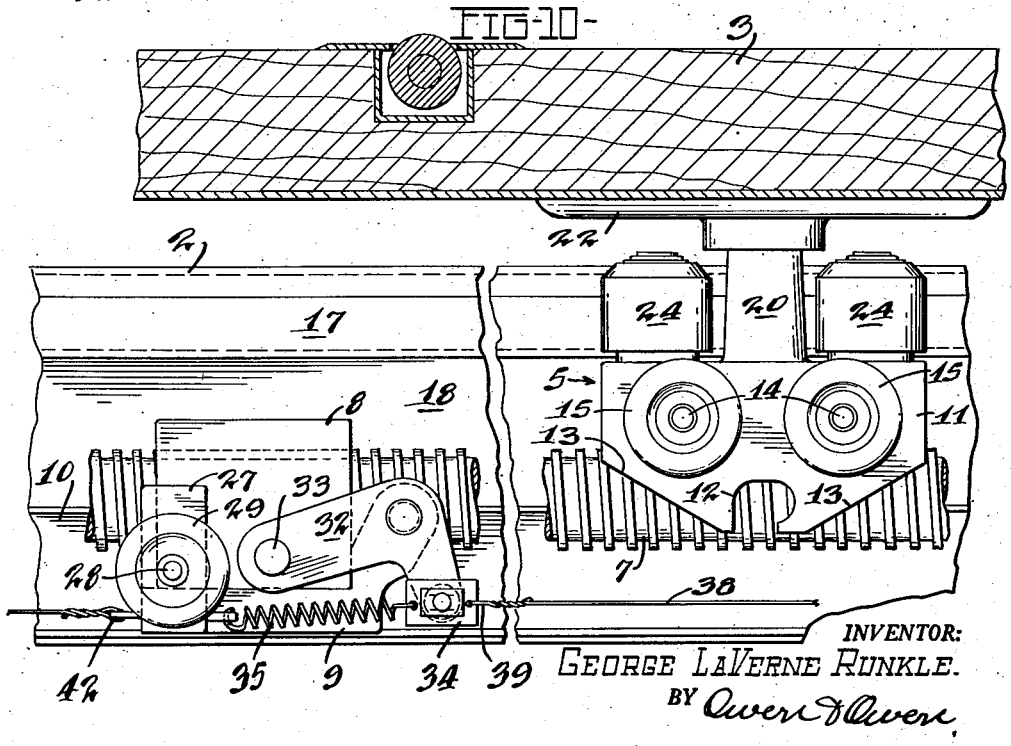
INVENTOR:
GEORGE LaVERNE RUNKLE.
BY Owen & Owen,
ATTYS.

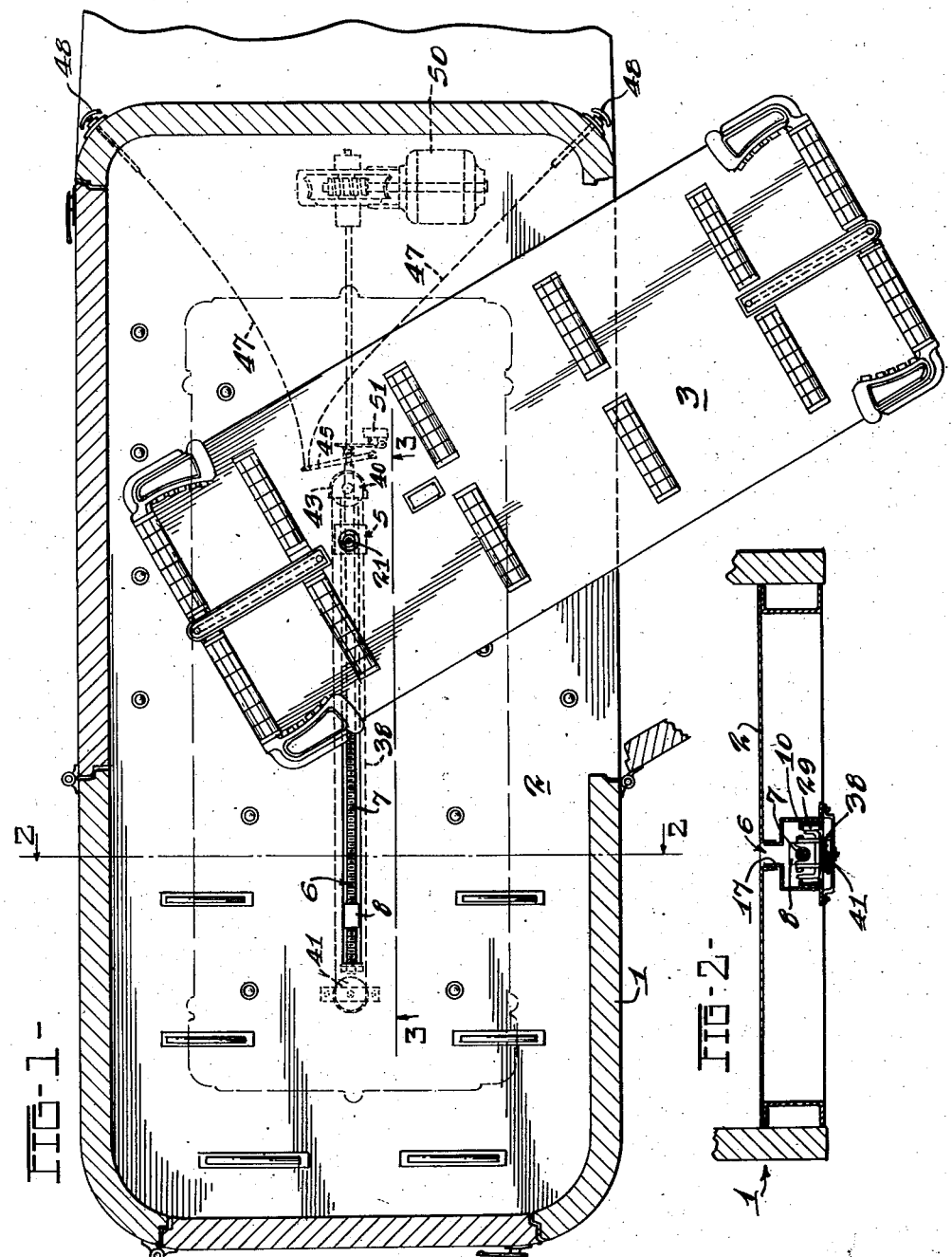

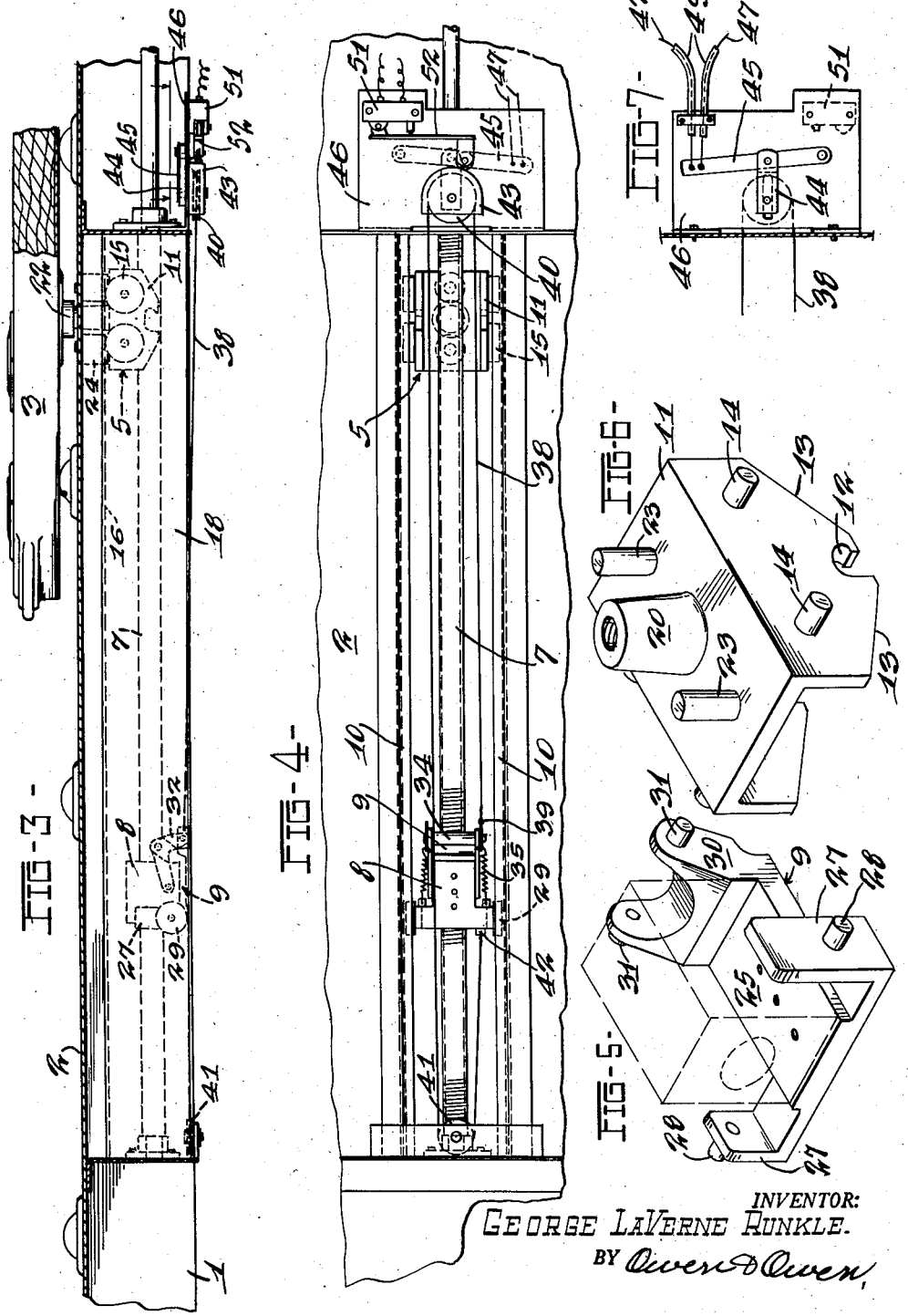

Patented Oct. 30, 1951

2,573,496

UNITED STATES PATENT OFFICE 2,573,496

RELEASABLE TABLE OPERATING MEANS FOR HEARSES

George La Verne Runkle, Lima, Ohio, assignor to Superior Coach Corporation, Lima, Ohio, a corporation of Ohio Application October 29, 1949, Serial No. 124,405

11 Claims. (Cl. 214—83.24)

This invention relates to hearses, or the like, having casket supporting tables movably mounted therein for partial projection through side and/or rear openings of the hearse, and has particular reference to connecting the table to a feed screw in a manner to permit an easy and rapid manual engagement of the table with a feed screw and its release therefrom.

The object of the invention is the provision in combination with a feed screw and nut for the purpose described, of a simple and efficient means that is operable to engage the nut with the casket carrying table of a hearse to permit power operation of the table or to release the connection between the nut and table to permit manual operation of the table.

Other objects and advantages of the invention will be apparent from the following detailed description, and from the accompanying drawings illustrating one embodiment of the invention, in which—

Fig. 1 is a horizontal section, conventionally shown, of a hearse body with a casket carrying table movably mounted on the hearse floor in released relation to the feed screw with the forward end of the table projected through a side opening of the hearse; Fig. 2 is a cross-section on the line 2—2 in Fig. 1; Fig. 3 is an enlarged section on the line 3—3 in Fig. 1; Fig. 4 is a fragmentary bottom view of the hearse body and of the operating mechanism shown in Fig. 3; Fig. 5 is a perspective view of the feed nut carrying member with parts removed; Fig. 6 is a similar view of the shuttle member carried by the table; Fig. 7 is a top view of the control assembly shown at the right of Fig. 4; Fig. 8 is an enlarged sectional detail of the feed means for the table, with the separable or releasable parts in feeding engagement and with the section taken lengthwise of the feed screw; Fig. 9 is a similar section taken crosswise of the feed screw in advance of the connected feed means, and Fig. 10 is an enlarged fragmentary vertical section taken lengthwise of the feed screw, with the table feed parts disconnected and in full.

Referring to the drawings, 1 designates a hearse body having in its casket compartment a floor 2 over which a casket carrying table 3 operates. The table has a rolling or substantially frictionless support on the floor 2 to permit it to be easily moved to or from casket receiving or delivery position through openings at the rear and at one or both sides of the hearse body, as well understood in the art.

Pivotally connected to and projecting downward from the table centrally of its sides and near its rear end is a shuttle 5 and this is engaged in a longitudinally extending slot 6 in the hearse bottom 2 and is guided thereby for movements lengthwise of the hearse, as hereinafter described. Beneath the slot 6 and floor 2 lengthwise of the former is a feed screw 7 having a nut block 8 threaded thereon and carried, in the present instance, by a carrier 9 that is supported and guided for movements lengthwise of the screw by channeled rails 10 and with which carrier the shuttle 5 has reasable engagement, as hereinafter more particularly described.

The shuttle 5 includes a channel or inverted U-shaped body member 11 the side walls of which project downwardly in spaced transverse relation and each has a notch 12 in its lower free edge substantially midway of its ends and which is undercut at one side so that the notch is substantially of L-form. The edge of each wall is tapered outwardly in both directions from adjacent to its notch, as shown at 13 (Figs. 6 and 10), and each wall has a pair of longitudinally spaced studs 14 projecting outward therefrom and carrying rollers 15. These rollers bear upwardly against a respective horizontal flange 16 that projects outwardly from the adjacent side wall 17 forming the guide slot 6. Each flange 16 terminates at its outer edge in a dependent flange 18 that carries the respective guide rail 10 at the inner side of its lower edge portion. Such lower edge is also turned outward for strength.

A boss 20 projects upward from the central portion of the cross top part of the shuttle 5 and this has a bolt stud 21 projecting upward therefrom and pivotally connected to a bearing plate 22 secured to the bottom of the table 3, thus permitting horizontal turning movements of the table relative to the shuttle. At each end of the shuttle body 11 at a side of the boss 20 is a stud 23 carrying a roller 24 which in turn travels in the floor slot 6 and is guided by its walls.

The nut carrier 9 includes a body member shown in perspective in Fig. 5 and this has a flat portion 25 on which the nut block 8 rests and is rigidly secured by screws 26. At one end the part 25 has outwardly and upwardly extending ears 27 having studs 28 projecting outwardly therefrom and on which rollers 29 are mounted. These rollers travel in the guide channels 10, as best shown in Fig. 9.

The carrier part 25, at the opposite end to the ears 27, has an upstanding boss 30 the top of which is recessed to freely receive the lead screw 7 and at each side it is provided with a stud 31 forming the fulcrum for a respective trip or catch lever 32. These levers are of L-form and each has an arm extending toward the opposite end of the carrier and provided with an outturned latch stud 33 (Fig. 10) for engagement with a respective notch 12 in the shuttle member 11 when such member straddles the nut 8 and carrier as it is intended to do when the shuttle and carrier are in connection. The other arm of each lever extends downwardly and is connected at its free end by a cross-bar 34 to the free end of the corresponding arm of the companion lever so that both levers operate in unison. Coiled contractile springs 35, one at each side of the carrier unit 9, connect the ends of the cross-bar 34 to the lower or inner ends of the ears 27. These springs act to normally hold the lever latch studs 33 in engagement with the respective notches 12 in the shuttle member 11. It is apparent that outward pull on the cross-bar 34 will move the latch levers against the tension of the spring and effect release of the shuttle member to permit it to move lengthwise of the guide slot 6 relative to the nut 8 and its carrier 9.

A trip cable 38 has one end attached to the cross-bar 34 at 39, then extends forward around a pulley 40, then rearward to and around a pulley 41, and then forward and connects to the rear end of the carrier member 9, as shown at 42 (Figs. 4 and 10). The axis of the pulley 41 is stationary against transverse movement while that of the pulley 40 is shiftable lengthwise of the hearse floor to apply a longitudinal pull on the cable against the tension of the springs 35, thus releasing the engagement of the latch levers 32 from the shuttle member 11. For the purpose of this movement of the pulley 40, it is mounted in a housing 43 and this housing is carried by a slide 44 which has connection with a control lever 45 (Figs. 3, 4 and 5). This lever is mounted on the under side of a plate 46 attached to the under floor structure of the hearse, and the slide is attached to the pivot stud of the pulley, which stud projects through a slot in the plate with the pulley and its housing above the plate. Two pull wires 47 are attached to the free end of the lever 45 and these extend to opposite sides of the casket compartment at the front end thereof and terminate in pull handles 48, as shown in Fig. 1. The wires 47 extend through guide conduits 49.

An electric motor 50 has driving connection with the forward end of the feed screw 7 and this motor is in circuit with a normally closed stop switch 51 that is opened by an inward movement of the lever 52. This lever bears outwardly at its free end against the forward edge of the pulley housing 43 so that a forward movement of the pulley and housing to effect a tripping of the catch lever 32 from engagement with the shuttle member 11 will move the switch lever to open the switch and thus stop the motor.

The shuttle 5 having been released from engagement with the catch levers 32, the table 3 and shuttle 5 are free to be moved into and out of casket receiving and discharging positions entirely independent of the operation of the lead screw and its feed nut. The shuttle, after a release from the nut carrier, can be easily and quickly re-engaged therewith by simply moving the table to place the shuttle adjacent to the nut carrier and then forcing the registering inclines 13 of the shuttle over the catch lever lugs 33 to cause them to snap into engagement with the notches 12. The shuttle and nut carrier remain in this engaged relation until one or the other of the trip wires 47 is moved to effect their release.

It is apparent that I have provided a simple and efficient power drive means for moving the casket carrying tables of the hearse into and out of casket receiving and discharging positions, and that this means is capable of being easily and quickly operated by hand to release the table from the drive means and to permit manual manipulation thereof.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an apparatus of the class described wherein a feed screw with nut thereon is mounted lengthwise of a hearse floor, and a casket carrying table is mounted over the screw, the provision of a shuttle pivotally carried by the table and guided for movements in the hearse lengthwise of the screw, a carrier for the nut, and manually releasable means for connecting said shuttle and carrier to cause them and the nut to have feeding movements together when the screw is turned.

2. In an apparatus of the class described wherein a feed screw with nut thereon is mounted lengthwise of a hearse floor, and a casket carrying table is mounted over the screw, the provision of a shuttle pivotally attached to the table, a carrier for the nut, and manually releasable means for connecting said shuttle and carrier to cause them and the nut to have feeding movements together lengthwise of the screw when the screw is turned, said releasable means including latch members carried by one of said shuttle and carrier and spring actuated to have catch connection with the other.

3. An arrangement as called for in claim 2 together with means having connection with said latch members and manually operable from a remote point of the hearse to release the connection between the shuttle and carrier.

4. In an apparatus of the class described wherein a feed screw with nut thereon is mounted lengthwise of a hearse floor and a casket carrying table is mounted over the screw, the provision of a shuttle of inverted U-form in cross-section for straddling the nut and pivoted to the under side of the table for horizontal turning relative thereto, a releasable connection between said shuttle and nut to cause them to travel in unison, means manually operable to release said connection to permit the shuttle to travel separately from the nut lengthwise of the screw, and means for guiding the movements of the shuttle.

5. In an apparatus of the class described wherein a feed screw with nut thereon is mounted lengthwise of a hearse floor and a casket carrying table is mounted over the screw, the provision of a shuttle pivoted to the under side of the table for relative horizontal movements and being of inverted U-form in cross-section to adapt it to straddle the nut, latch members pivoted to and movable with one of said nut and shuttle to releasably connect them for movement together lengthwise of the screw when the latter is turned, means remotely operable to move said latch members to release said connection, and means for guiding the shuttle movements.

6. In an apparatus of the class described wherein a feed screw wih nut thereon is mounted lengthwise of a hearse floor and a casket carrying table is mounted over the screw, the provision of a carrier for the nut, a shuttle pivoted to the table, means guiding the carrier and shuttle for parallel movements lengthwise of and adjacent to the screw, lever means carried by one of said carrier and shuttle and adapted to have catch engagement with the other to cause the carrier and shuttle to move in unison lengthwise of the screw when it is turned, means operable to yieldingly hold the catch means in catch engagement with its companion, and means connected to the catch means and remotely operable to move it to release its companion to permit relative movements of the carrier and shuttle.

7. In an apparatus of the class described wherein a feed screw with nut thereon is mounted lengthwise of a hearse floor and a casket carrying table is mounted over the screw, the provision of a shuttle pivotally attached to the table at the under side thereof, means for guiding the movements of the shuttle and table lengthwise of the screw adjacent thereto, means for releasably connecting the shuttle and nut to cause them to have movements in unison lengthwise of the screw, spring means normally holding said releasable means in position to connect the shuttle and nut, and trip means for said releasable means comprising pulleys carried by the hearse at opposite sides of the shuttle lengthwise of the screw one of said pulleys being mounted for shifting movements toward and away from the companion pulley transverse to its axis, a cable extending around said pulleys with one end connected to the nut and with the other end connected to said releasable means in opposition to the spring holding means whereby transverse movements of the shiftable pulley will apply a releasing force to said releasable means, and means connected to said movable pulley to impart releasing movements thereto.

8. An arrangement as called for in claim 7, together with an electric power motor for said screw, a normally closed switch in circuit with said motor, and means actuated by releasing movements of said movable pulley to open said switch.

9. In an apparatus of the class described wherein a feed screw with nut thereon is mounted lengthwise of a hearse floor and a casket carrying table is mounted over the screw, the provision of a shuttle pivotally attached to the under side of the table for turning movements relative thereto, means for guiding the movements of the shuttle with the table lengthwise of the screw adjacent thereto, a catch lever normally operable to releasably connect said shuttle and nut to cause them to move in unison lengthwise of the screw, an electric power motor for the screw, a normally closed stop switch in circuit with said motor and having an operating lever movable to open the switch, and manually operable trip means for said catch lever comprising a pulley mounted at each side of the shuttle lengthwise of the screw, one of said pulleys being shiftable transverse to its axis toward and away from the other pulley, a cable looped around both pulleys and having one end connected to the nut and the other end connected to the catch lever whereby a relative outward movement of the pulleys will move the catch lever to release its connection with the nut and shuttle, said trip means having a part in movable contact with said switch lever to open the switch when the trip means is operated to release the nut and shuttle connection.

10. In an apparatus of the class described wherein a feed screw with nut thereon is mounted lengthwise of the hearse floor and a casket carrying table is mounted over the screw, the provision of a carrier for the nut, a shuttle pivotally carried by the table and being of inverted U-form in cross-section adapted to straddle the nut, means guiding the carrier and the shuttle for separate movements lengthwise of the screw, and manually releasable means connecting the carrier to the side arms of the shuttle to cause the carrier and shuttle to have movements together and to be released to have separate movements.

11. In an apparatus of the class described wherein a feed screw with nut thereon is mounted lengthwise of a hearse floor and a casket carrying table is mounted over the screw, the provision of a carrier for the nut, a shuttle pivotally carried by the table and being of U-shape in cross-section to straddle the nut, the leg portions of said carrier terminating in notches, means for separately guiding the carrier and shuttle for movements lengthwise of the screw, wheels on the carrier and shuttle in rolling engagement with said guide means, catch levers mounted on the carrier and adapted to have catch engagement with the notched portions of the shuttle legs, means yieldingly retaining the levers in catch engagement with the shuttle, and means connected to said catch levers and remotely operable for disengaging the levers from the shuttle.

GEORGE LA VERNE RUNKLE

REFERENCES CITED

The following references are of record in the file of this patent:

UNITED STATES PATENTS

| Number | Name | Date |
|---|---|---|
| 2,042,382 | Binkley | May 26, 1936 |
| 2,085,043 | Richter | June 29, 1937 |
| 2,196,265 | Krogh | Apr. 9, 1940 |
| 2,284,116 | Bench et al. | May 26, 1942 |
| 2,284,187 | Crosby et al. | May 26, 1942 |